United States Patent [19]
Satoh et al.

[11] Patent Number: 5,322,566
[45] Date of Patent: Jun. 21, 1994

[54] GLUING MONITOR

[75] Inventors: Kanji Satoh, Hoya; Toshiyuki Kasahara, Hino; Hironobu Yoshikawa; Munehiro Ishida, both of Hachioji, all of Japan

[73] Assignee: Nireco Corporation, Tokyo, Japan

[21] Appl. No.: 59,937

[22] Filed: May 13, 1993

[30] Foreign Application Priority Data

Jun. 12, 1992 [JP] Japan .................................. 4-152512
Mar. 17, 1993 [JP] Japan .................................. 5-056235

[51] Int. Cl.$^5$ ........................ B05C 5/02; B05C 11/00; B05C 11/10
[52] U.S. Cl. .................................... 118/712; 118/665
[58] Field of Search ........................ 118/712, 665, 324; 73/150 R

[56] References Cited

U.S. PATENT DOCUMENTS 4,251,566  2/1981  Gingerich .......................... 118/712
4,389,969  6/1983  Johnson ............................ 118/665

FOREIGN PATENT DOCUMENTS 2043617  3/1972  Fed. Rep. of Germany ...... 118/712
60-99641  6/1985  Japan .
8701893  3/1989  Netherlands ...................... 118/712
1450818  9/1976  United Kingdom ............... 118/712

Primary Examiner—Diego F. F. Gutierrez
Attorney, Agent, or Firm—Lowe, Price, LeBlanc & Becker

[57] ABSTRACT

A glue applicator nozzle and an electrode are placed facing each other, with a gluing object between. The applicator nozzle is connected to a high-frequency-wave transmitter unit, while the electrode is bound to a high-frequency-wave receiver unit. The glue is discharged from the applicator nozzle, and applied on the gluing object, so that the state of continuous presence of glue between the applicator nozzle and the gluing object enables the transmission of the high-frequency wave between them for monitoring the desired performance of gluing process. In an alternate arrangement the electrode is set on the side of the applicator nozzle, and facing the glue applied on the gluing object.

10 Claims, 12 Drawing Sheets

GLUING MONITOR

BACKGROUND OF THE INVENTION

1. Field of the Invention

This invention relates to a monitoring device for the desired application of glue on gluing objects with a glue applicator nozzle.

2. Description of the Prior Art

Gluing processes in sack machines and collators employ the gluing operation with applicator nozzles. The gluing is monitored by detecting the appropriate application of glue on the gluing objects with the applicator nozzle. A monitoring method for gluing which has been available is the capacitance method, in which the gluing object to which glue is applied is inserted between two electrodes to monitor the performance of the gluing operation by measuring the difference in the capacitance between the electrodes as it is effected by the glue applied. An optical method has also been in use which detects the reflected light from colored glue. In the Japanese Patent Application Provisional Publication No. 60-99641 another method is disclosed which evaluates the quantity of glue applied by detecting the attenuation rate at the receiving electrode during transmission of a high-frequency wave between the transmitting and receiving electrodes with gluing object inserted between the electrodes.

In this capacitance method two electrodes are placed facing each other with the gluing object between. Hence both of the electrodes face the glue on the gluing object. In this arrangement the glue coats the electrode surface, causing vast variation in the measured value of capacitance, making it difficult to obtain an exact measurement. The moisture also would yield variation in the measured values, resulting in difficulty in obtaining stable monitoring. On the other hand, the optical method would require the use of colored glues, while in the method of JPAPP No. 60-99641, besides the necessity of two-electrodes, spacing between the electrodes is reduced to raise the monitoring sensitivity because the gluing object moves between the electrodes.

SUMMARY OF THE INVENTION

It is accordingly an object of this invention to replace one of the conventionally used pair of facing electrodes with the glue discharged out of the applicator nozzle.

It is another object of the invention to improve the signal/noise ratio of the transmitted signal by reducing the distance between the electrode and the glue discharged out of the applicator nozzle.

This invention accomplishes the objects by employing the glue applicator nozzle; the electrode placed facing to the applicator nozzle with the gluing object between; the high-frequency-wave transmitter unit connected to either the electrode or the applicator nozzle; the high-frequency-wave receiver unit connected to the other; and the gluing monitor unit to detect a desired application of glue on said gluing object by comparison of the output from this high-frequency-wave receiver unit with a reference value.

DETAILED DESCRIPTION OF THE PREFERRED EMBODIMENTS

Some preferred embodiments of the invention will be described hereinbelow with reference to the accompanying drawings.

Figure 1:
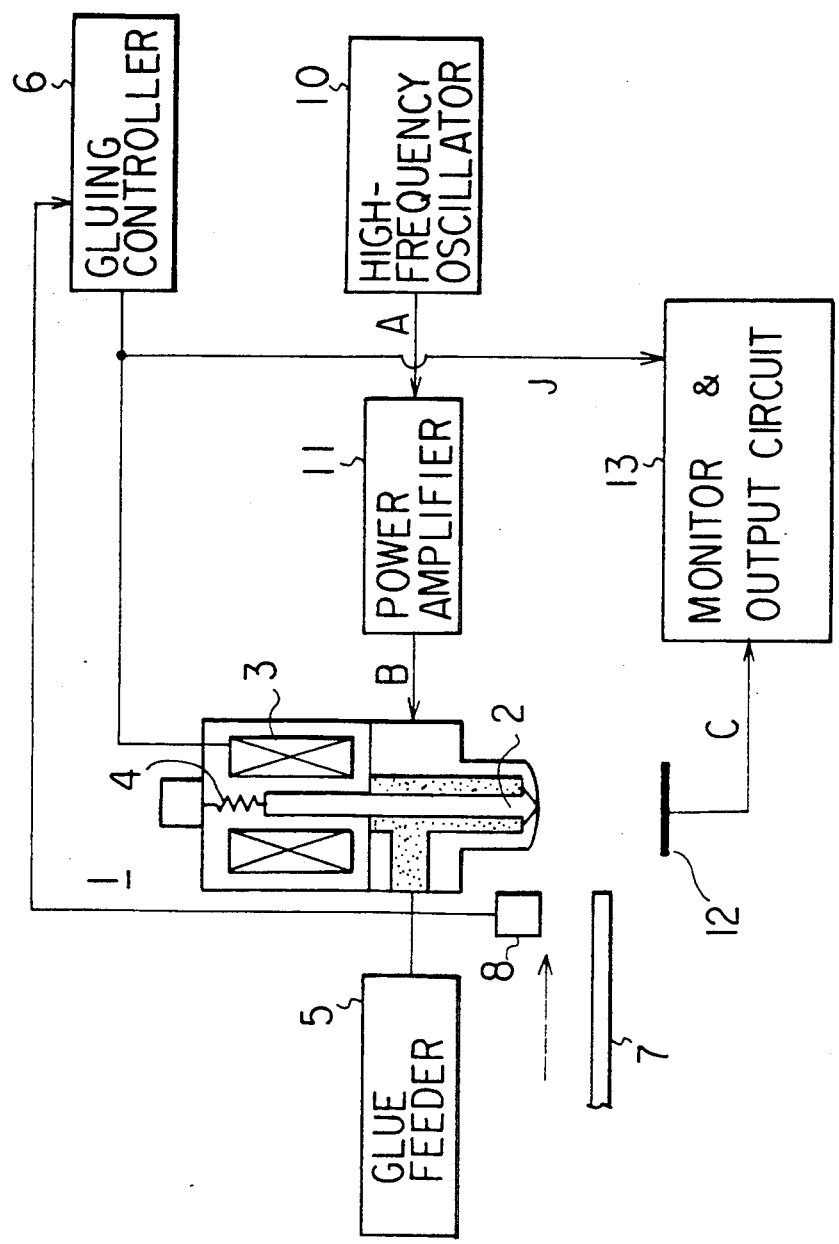
FIG. 1 is a block diagram showing the structure of the first embodiment of a gluing monitor in accordance with the present invention.

FIG. 1 is a block diagram showing the structure of the first embodiment of this invention. The metallic applicator nozzle 1 discharges the glue supplied from the glue feeder 5 on the gluing object 7 moving in the arrow direction. The needle 2 makes the nozzle 1 open or close to accordingly start or stop the glue discharge. The needle 2 is pressed with the spring 4 to close the nozzle 1, and lifted up against the pressure of the spring 4 when the gluing controller 6 runs the current in the coil 3 which is wound around the needle 2. Accordingly, the glue is discharged through the opening between the needle 2 and the nozzle 1. The gluing object monitor 8 is placed close to the applicator nozzle 1 and perceives the arrival of the gluing object 7. The monitor 8 then sends a signal to the gluing controller 6, which runs the current in the coil 3 to lift up the needle 2. The needle 2 remains lifted during a desired period while the gluing object 7 is passing beneath the applicator nozzle 1 so that the glue is discharged out of the nozzle to apply on the gluing object 7. That is, on receiving the output signal from the gluing object monitor 8, the gluing controller 6 sends a signal to the coil 3 to open the nozzle during an interval determined by the transfer velocity of the gluing object 7 and the specified width of gluing.

The high-frequency oscillator 10 generates a wave with constant amplitude (for instance, 30 Vp-p) and frequency (for instance, 500 kHz). The wave is amplified by the power amplifier 11 and transmitted to the applicator nozzle 1. The electrode 12 is faced to the applicator nozzle 1. The gluing object 7 moves between the applicator nozzle 1 and the electrode 12. The monitor & output circuit 13 analyzes the high-frequency wave received from the electrode 12 for detection of desired application of glue on the gluing object 7 and generates a resulting output signal.

The glue is conductive due to water contained therein, normally over ten percent. During transmission of high frequency the glue continues from the applicator nozzle 1 to the gluing object 7. A high-frequency voltage is transmitted to the applicator nozzle 1 and received by the electrode 12, which is faced to the applicator nozzle 1 with the gluing object 7 between. When the glue continues from the applicator nozzle 1 to the gluing object 7, the glue on the gluing object 7 works as electrode to transmit the high-frequency wave to the electrode 12. On the other hand, the transmission of high-frequency wave between the applicator nozzle 1 and the gluing object 7 is impossible when the glue is no longer flowing between them. It is thus feasible to determine the continuity of glue between the applicator nozzle 1 and the gluing object 7 if a high-frequency wave generated by the high-frequency oscillator 10 is transmitted to the applicator nozzle 1 and the monitor & output circuit 13 receives the wave higher than a reference value. The continuity of glue is determined at the application stage of glue on the gluing object 7 from the applicator nozzle 1, therefore indicating the successful gluing. With a constant spacing between the gluing object 7 and the electrode 12, the larger the area of glue application the higher the response in the received high-frequency wave, enabling simultaneous measurement of the quantity of glue applied on the gluing object 7. Moreover, the transmission has large S/N ratio because the spacing between the glue and the facing electrode is narrow and the attenuation of the received signal is small against the transmitting signal.

Figure 2:
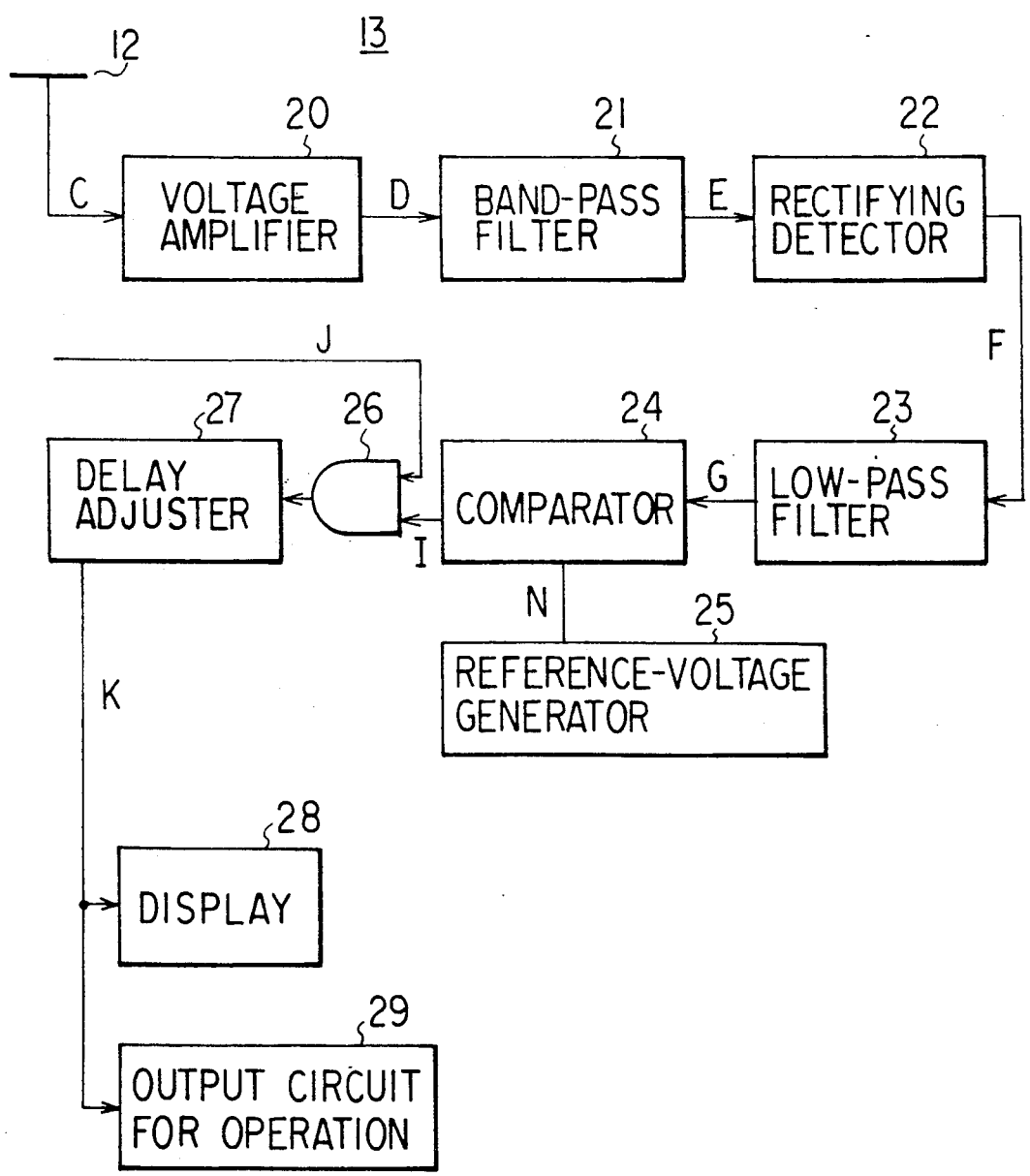
FIG. 2 is a detailed block diagram for a monitor output circuit in the first embodiment of the invention.

In FIG. 2 the monitor & output circuit 13 is demonstrated in detail. The high-frequency wave received from the electrode 12 is amplified with the voltage amplifier 20 to improve the S/N ratio through the band-pass filter 21 the improvement by restraining the effects of noises with frequency components other than the mean frequency of the received wave set equal to the transmitting frequency, i.e., oscillator frequency of the high-frequency oscillator 10.

The rectifying detector 22 singles out the signal for presence of glue, from which the high-frequency components are removed through the low-pass filter 23. The comparator 24 compares the analog signal from the low-pass filter 23 with a reference voltage generated by the reference-voltage generator 25 and assigns signals which are higher or lower than the reference voltage to the L or H level, respectively. The and-gate 26 performs logic product of the output signal of the comparator 24 and the signal of the gluing controller 6 to run the current in the coil 3 shown in FIG. 1. The delay adjuster 27 is a circuit for neglect of a transient variation in the output of the and-gate 26 to prevent an abnormal signal from being transmitted in response to slight delay between the signals I and J. The display 28 indicates normal gluing for the L level in the output of the delay adjuster 27, and abnormal operation for the H level. The output circuit 29 yields the signal for such operation as halt of the transfer of the gluing object 7 when the output of the delay adjuster 27 is at the H level.

Figure 3:
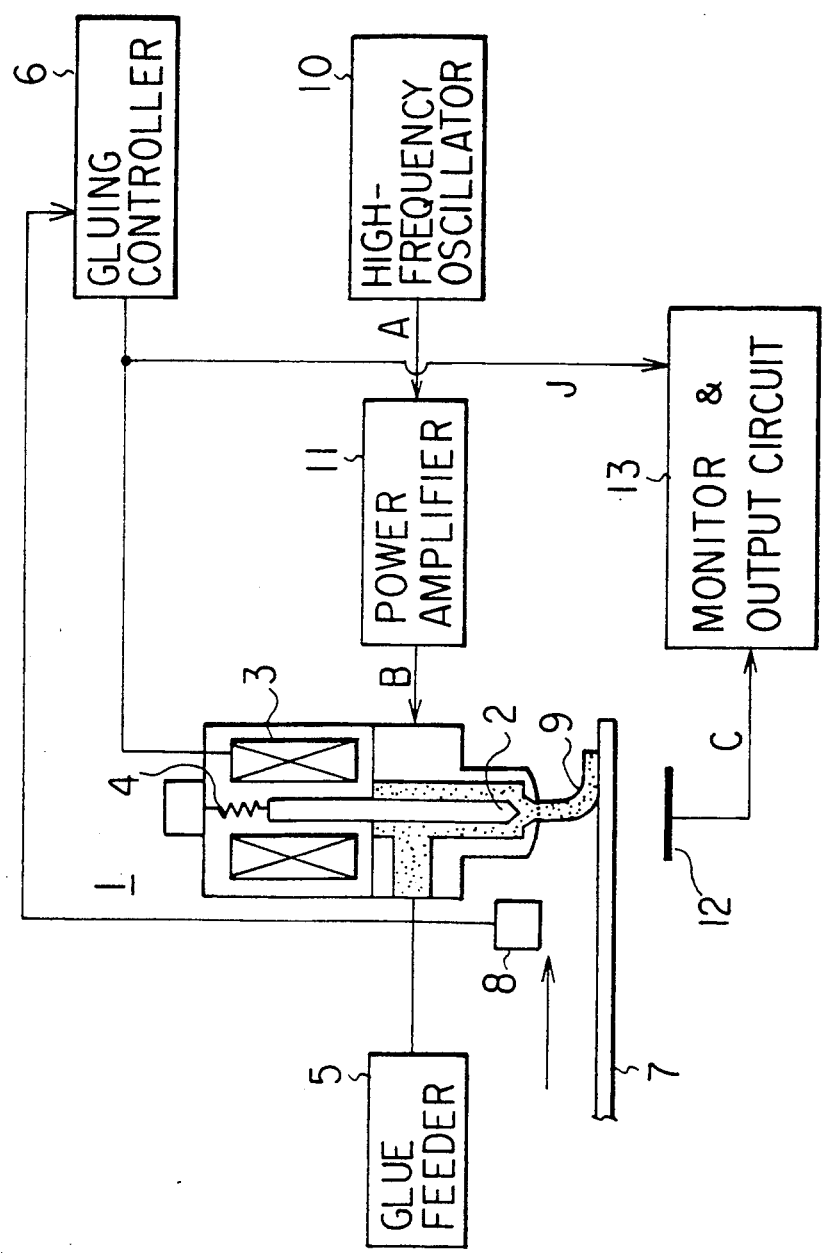
FIG. 3 illustrates the process in discharging the glue on the gluing object out of the applicator nozzle in the first embodiment of the invention.
Figure 4:
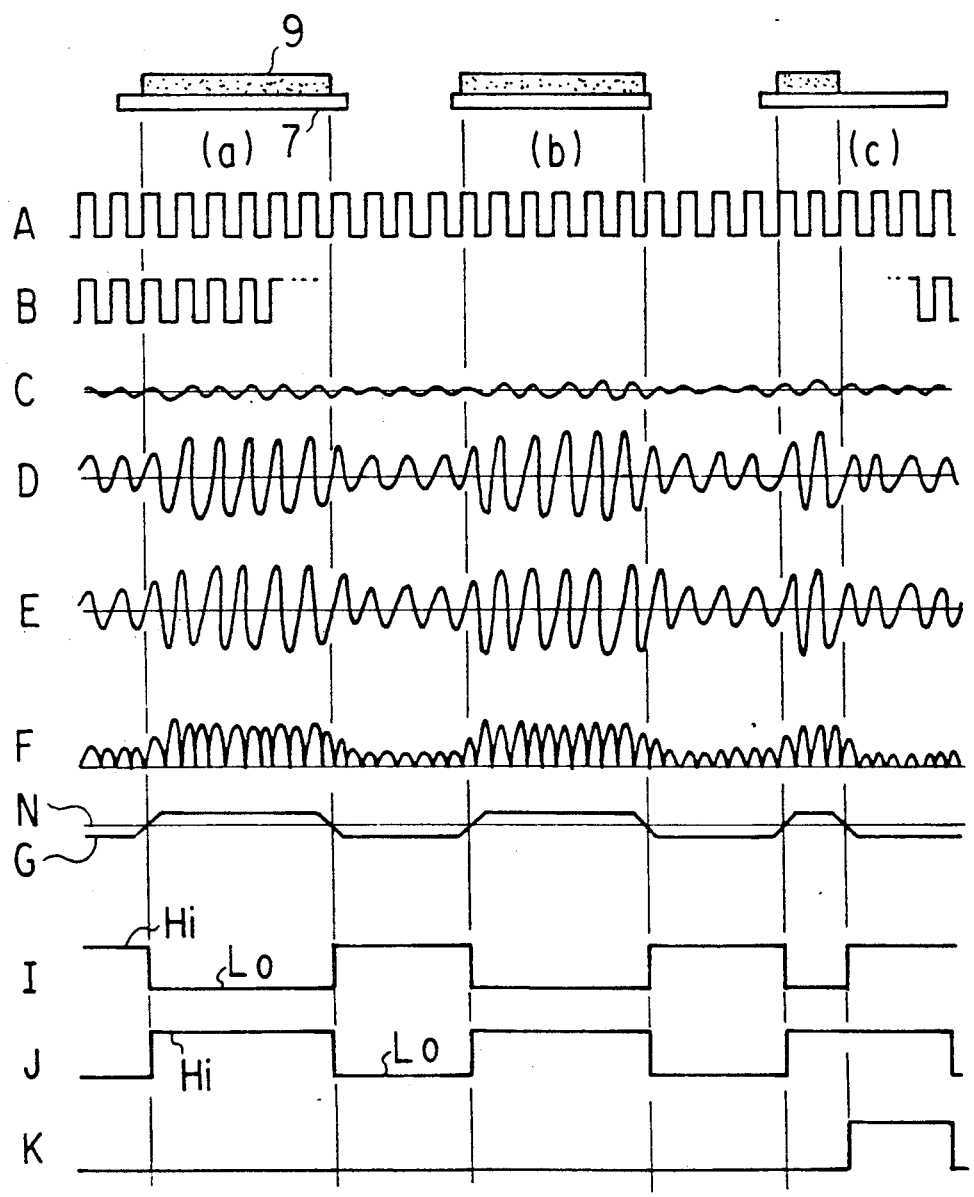
FIG. 4 shows the output wave forms from the respective circuits in FIGS. 1 and 2.

FIG. 3 illustrates the discharging process of the glue 9 from the nozzle as the needle 2 is lifted up by running the current in the coil 3. In FIG. 4 the output wave forms are given for the respective circuits in FIGS. 1~3. The operation is explained hereinbelow with reference to these figures. In FIG. 4 the columns (a), (b) and (c) indicate the states of the gluing object 7 applied with the glue 9 and the rows A~K and N show the wave forms at these states.

When the gluing object monitor 8 perceives the gluing object 7, the gluing controller 6 runs the current in the coil 3 to lift up the needle 2 for discharge of the glue 9 on the gluing object 7. The high-frequency oscillator 10 generates a 500 kHz high-frequency wave as indicated in A. Power amplification of this wave with the power amplifier 11 yields the wave form B, which is the same as A except amplified. The high-frequency amplified wave applied on the applicator nozzle 1 transfers through the discharging glue to the glue 9 applied on the gluing object 7 and to the electrode 12.

The electrode 12 receives the high-frequency wave from the glue 9 or the applicator nozzle 1 according to whether the glue 9 is discharged or suspended. The output is weak like C. Therefore the wave is amplified with the voltage amplifier 20 to the wave like D. The band-pass filter 21 removes the noises in D to yield the wave E which has a higher S/N ratio. The rectifying detector 22 rectifies the full-wave of E to the wave F, which transforms to the wave G through the low-pass filter 23. The compatator 24 compares the wave G with a reference voltage N given by the reference-voltage generator 25 to turn out the H output if N is higher than G and the L output if N is lower than G, as shown in I. The wave J is set to H when the gluing controller 6 runs the current in the coil 3, and to L when no current flows in the coil 3, respectively. The and-gate 26 performs logic product of I and J to give the output K. Since J is at H for the discharging state of the glue 9 by lifting of the needle 2 and I is at H for the missing state of the glue 9 on the gluing object 7, the H output from logic product of I and J corresponds to an abnormal state that the glue 9 is not discharged out of open applicator nozzle 1. In this case the display 28 indicates the occurrence of abnormal state and the output circuit for operation 29 sends a signal to operate the switching such as for halt of the transfer of the gluing object 7.

Figure 5:
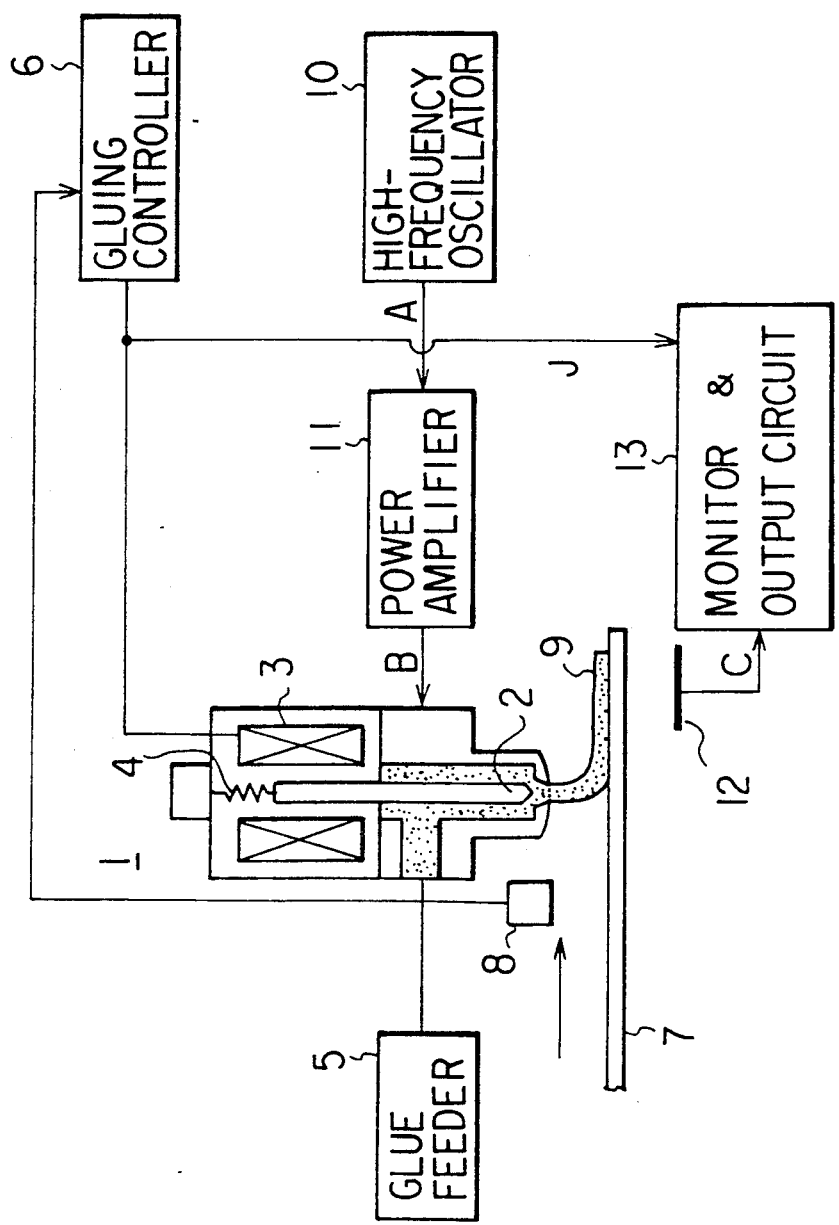
FIG. 5 displays the second embodiment of the invention in which the center of the electrode is shifted from the center of the applicator nozzle downward in the transfer direction of the gluing object.

The second embodiment will be explained in the following with reference to FIG. 5, which shows an arrangement of the electrode 12 shifted from the applicator nozzle 1 sideways in the transfer direction of the gluing object 7. The high-frequency wave is transmitted from the glue 9 discharged and applied on the gluing object 7 so that the center of the applicator nozzle 1 is not required to coincide with the central region of the electrode 12. The vertical alignment of the applicator nozzle 1 and the electrode 12 is rather undesirable because an operation test of the nozzle without the gluing object 7 drops and deposits the glue on the electrode 12 to cause an erroneous perception of the presents of the gluing object 7 to the electrode 12. Consequently, the electrode 12 needs to be cleaned by removing the deposited glue. The vertical alignment is again inconvenient to disassemble and dismount the applicator nozzle 1 for its maintenance and overhaul. The shifted arrangement, such as in FIG. 5, thus is of advantage.

Figure 6:
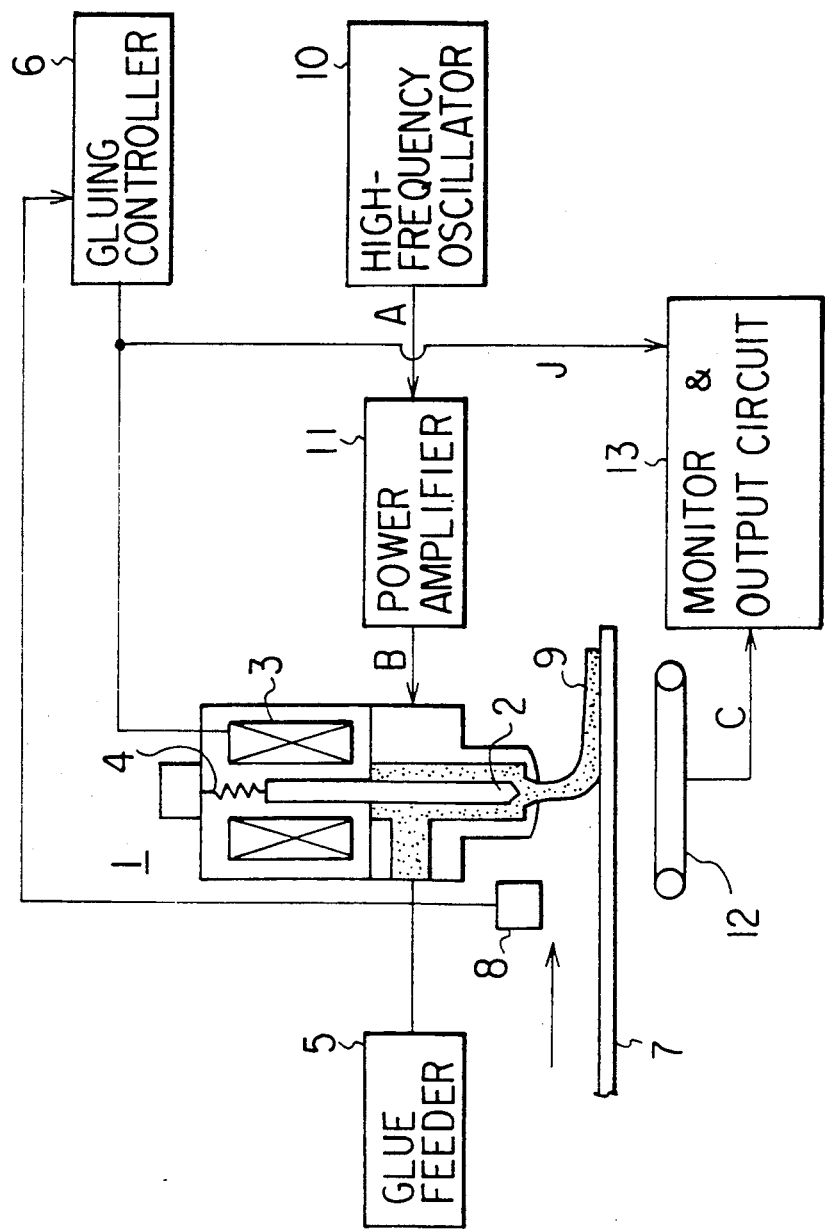
FIG. 6 demonstrates the third embodiment of the invention wherein a ring-shaped electrode is employed.

The third embodiment will be explained in the following with reference to FIG. 6, in which a ring-shaped electrode is employed for the electrode 12. Instead of shifting the electrode 12 sideways from the applicator nozzle 1, the electrode 12 is made ring-shaped so that a part of the electrode 12 can be placed horizontally. In this case dropping of glue on the electrode can also be avoided for an operation test without the gluing object 7 in spite of the vertical alignment of the applicator nozzle 1 and the electrode 12.

Figure 7:
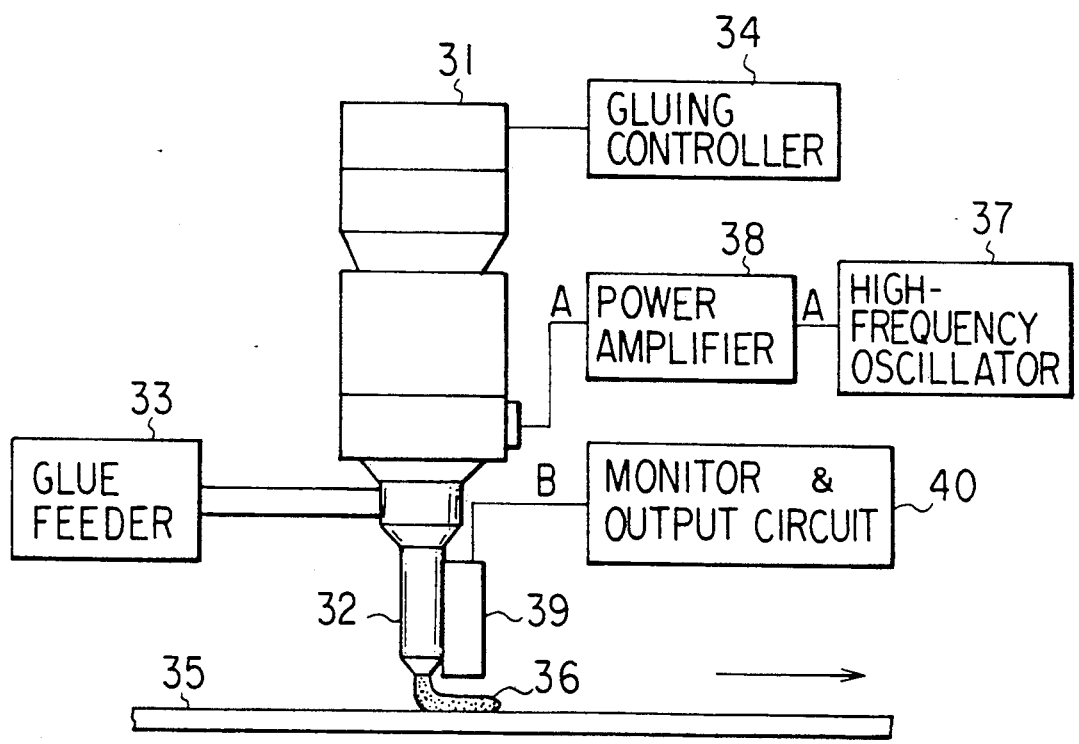
FIG. 7 is a block diagram showing the structure of the fourth embodiment of the invention.

The fourth embodiment will be explained in the following. FIG. 7 is a block diagram showing the arrangement in this embodiment. The glue feeder 33 supplies the glue 36 to the metallic applicator nozzle 31 which discharges the glue 36 to the gluing object 35 moving in the arrow direction. The gluing controller 34 controls the applicator nozzle 31 to discharge and suspend the glue for continuous and intermittent application of glue on the gluing object 35. The electrode unit 39 is located at the nozzle head 32 of the applicator nozzle 31.

The high-frequency oscillator 37 generates a wave with constant amplitude (for instance, 30 Vp-p) and frequency (for instance, 500 kHz), the power of which is amplified by the power amplifier 38 to impress on the applicator nozzle 31. The electrode unit 39 receives the high-frequency wave from the discharging glue 36 out of the nozzle head 32 of the applicator nozzle 31 or the glue 36 applied on the gluing object 35. The monitor & output circuit 40 analyzes the high-frequency wave received from the electrode unit 39 for detection of desired application of the glue 36 on the gluing object 35 to deliver the resulting output.

Figure 8:
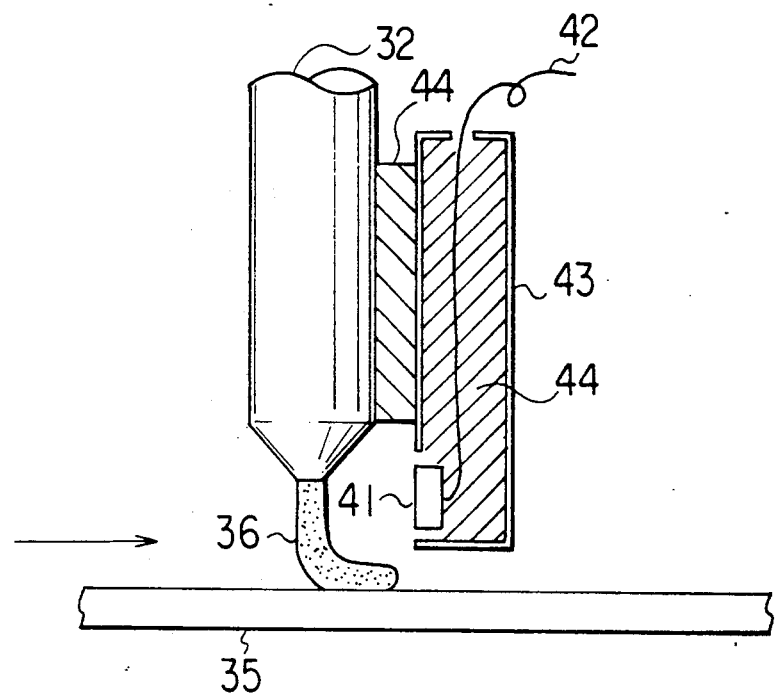
FIG. 8 illustrates in detail the electrode unit of vertical type.

The electrode unit 39 has two types of electrode; the vertical electrode type to receive the high-frequency wave from the discharging glue 36 out of the nozzle head 32 and the horizontal electrode type to receive the high-frequency wave from the glue 36 applied on the gluing object 35. FIG. 8 illustrates an arrangement of the vertical type of electrode in unit 39. The vertical electrode 41 is placed in parallel to the discharge direction of the applicator nozzle head 32. The electrode 41 is shielded with the conductor 43 which is filled with the insulating material 44. The conductor 43 is grounded through ground wire 42. Consequently, the high-frequency wave transmitted from the glue 36 discharged out of the nozzle head 32 is mainly received by the electrode 41.

Figure 9:
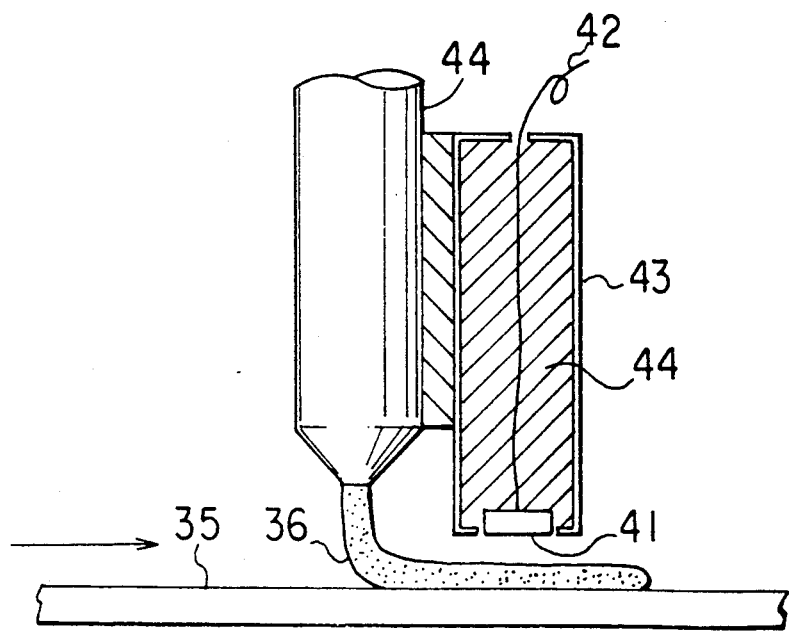
FIG. 9 displays in detail the electrode unit of horizontal type.

FIG. 9 displays an arrangement of the horizontal type of electrode unit 39, in which the electrode 41 is located in parallel to the gluing object 35. The electrode 41 is shielded with the conductor 43 which is filled with the insulating material 44. The conductor 43 is grounded through ground wire 42. Consequently, the high-frequency wave transmitted from the glue 36 applied on the gluing object 35 is mainly received by the electrode 41.

The electrode unit 39 of vertical type can detect the discharge of the glue 36 out of the nozzle head 32 regardless of the gluing width, but the manner of application of the glue 36 on the gluing object 35 is not observed. On the other hand, the electrode unit 39 of horizontal type cannot receive the high-frequency wave unless the glue 36 continues from the nozzle head 32 to the gluing object 35. Detection of intermittent application of glue, therefore, requires the gluing width longer than some specified value. Each type of electrode thus has its proper exploitation depending on its particular application. Furthermore, a coupled structure of the electrode unit 39 and the applicator nozzle 31 enables their concerted movement, and requires no individual adjustment of their positions when the gluing site is changed.

Figure 10:
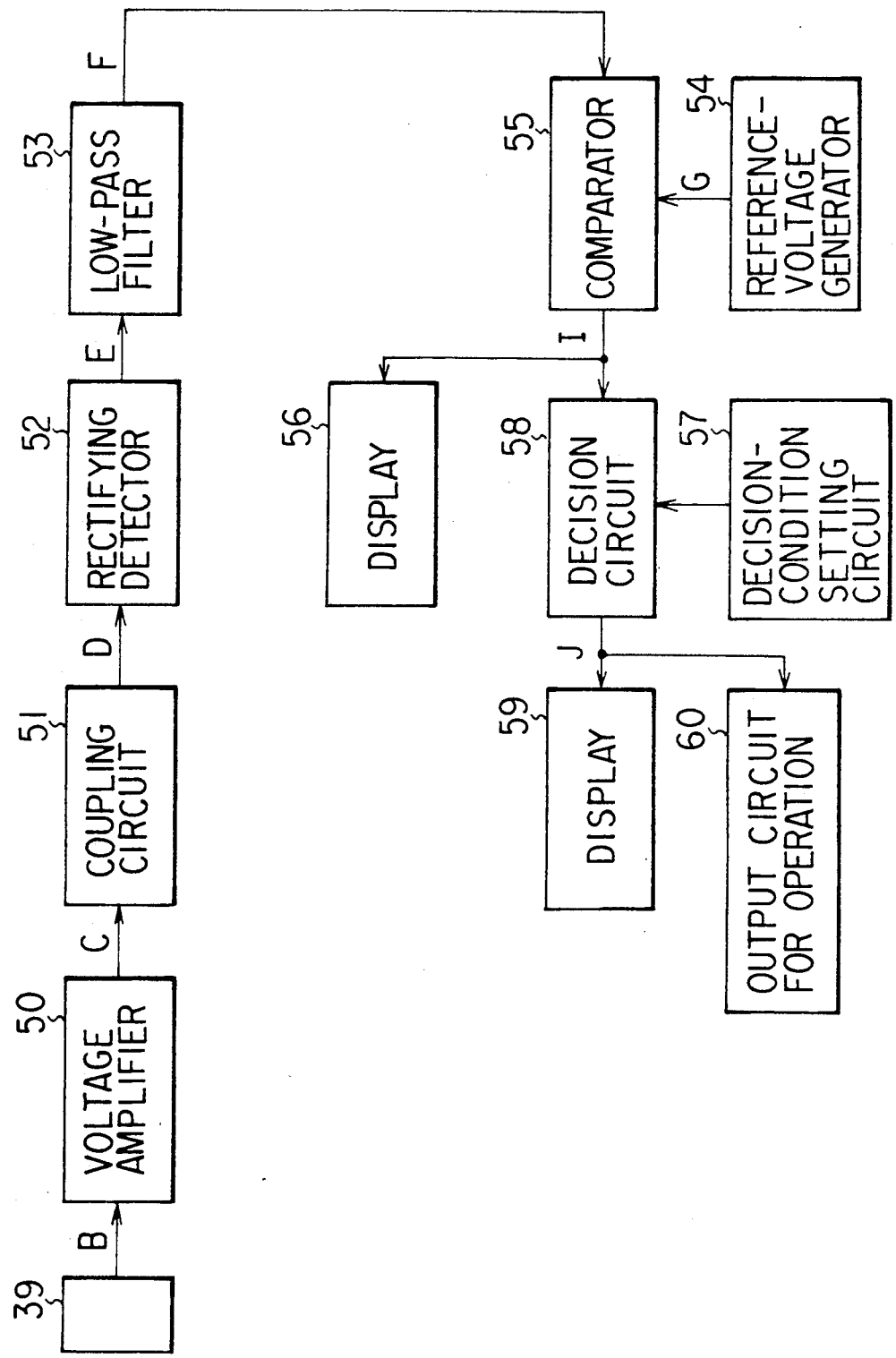
FIG. 10 is a detailed block diagram of the monitor output circuit in the fourth embodiment of the invention.

FIG. 10 displays the monitor & output circuit 40 of FIG. 7 in detail. The voltage of the high-frequency wave is amplified with the voltage amplifier 50. The output wave undergoes elimination of the direct-current component with the coupling circuit 51 so as to retain only alternating-current component. The coupling circuit 51 connects the capacitors in series to allow only the output of varying signals. The rectifying detector 52 isolates the signal indicating the presence of glue, from which the high-frequency components are removed with the low-pass filter 53. The comparator 55 compares the analogue signal from the low-pass filter 53 with a reference voltage generated by the reference-voltage generator 54 to assign the signal, if over the reference-voltage, to the H level and the signal, if below the reference voltage, to the L level, respectively. That is, the H level indicates the successful gluing and the L level the failure.

The display 56 exhibits the output of the comparator 55 for success or failure of gluing. The decision-condition setting circuit 57 defines the gluing conditions specified by the gluing controller 34, such as continuous gluing or intermittent gluing with a given pitch. The decision circuit 58 judges the output of the comparator 55 based on these gluing conditions to generate an abnormal signal when the output does not meet the conditions. This abnormal signal is released with the signal of successful gluing from the comparator 55. The display 59 indicates the abnormal state signal from the decision circuit 58, which also has the output circuit 60 yield a signal to the device for such operation as halt of transfer of the gluing object 35 in response to the signal.

Figure 11:
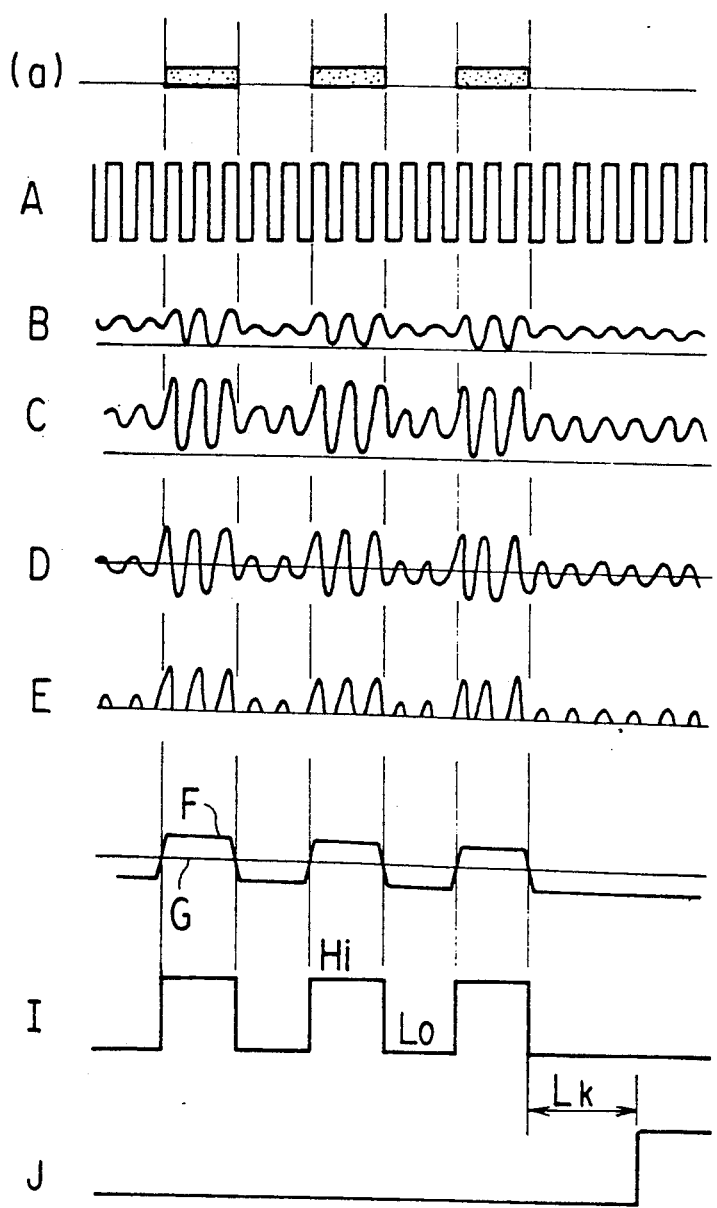
FIG. 11 shows the output wave forms in intermittent gluing from the respective circuits in FIGS. 7 and 10.

In FIG. 11 the output wave forms are given for the respective circuits in FIGS. 7 and 10, in the case that the applicator nozzle 31 intermittently discharges the glue 36 at a constant rate to apply the intermittent gluing on the gluing object 35 moving at a constant velocity. The electrode unit 39 is of vertical type as shown in FIG. 8. The operation is explained hereinbelow with reference to these figures. In FIG. 11 the row (a) indicates the state of the gluing object 35 intermittently applied with the glue 36 and the rows A~J show the wave forms corresponding to the state.

The electrode unit 39 of vertical type as shown in FIG. 8 detects the discharging manner of the glue 36 out of the nozzle head 32 for determination of the width applied with the glue 36 on the gluing object 35 or the interrupt of the gluing width as the transfer velocity of the gluing object 35 is specified. The intermittent application of gluing at a given pitch is prescribed in the gluing controller 34 and the output of an abnormal state signal against the interrupt of the gluing width or interval longer than $L_k$ is set in the decision-condition setting circuit 57. As the gluing object 35 moves at a constant velocity, measurement of the interval $L_k$ leads to the gluing width.

The gluing controller 34 initiates the gluing and simultaneously the gluing object 35 is transferred at a constant velocity beneath the applicator nozzle 31. The high-frequency oscillator 37 generates 500 kHz high-frequency wave as indicated in A. Power amplification of this wave with the power amplifier 38 yields a wave form same as A but with higher amplitude. The amplified high-frequency wave applied to the applicator nozzle 31 is transmitted from the discharging glue 36 toward the electrode 41.

The power of the high-frequency wave, like B, received with the electrode 41 is amplified to the wave like C, which includes the direct-current component due to the effects of temperature and other factors. The wave C retains only its alternating-current component like D through the coupling circuit 51, comprising the capacitors connected in series. The rectifying detector 52 rectifies the half-wave of D to the wave E, which transforms to the wave F by the low-pass filter 53. The comparator 55 compares the wave F with a reference voltage G given by the reference-voltage generator 54 to turn out the H output if F is higher than G and the L output if F is lower than G, as indicated in I on the display 56.

The decision circuit 58 monitors the duration of L in I to deliver an abnormal signal as shown in J when the interval exceeds $L_k$. This abnormal signal is released with the signal of successful gluing. The display 59 indicates the signal J, which also has the output circuit 60 deliver a signal for operation. The decision circuit 58 employs a timer for measurement of interval of $L_k$. The measurement of $L_k$ a given width is performed by counting the pulse number in an encoder placed on the rotating axis of the roller transferring the gluing object 35.

Figure 12:
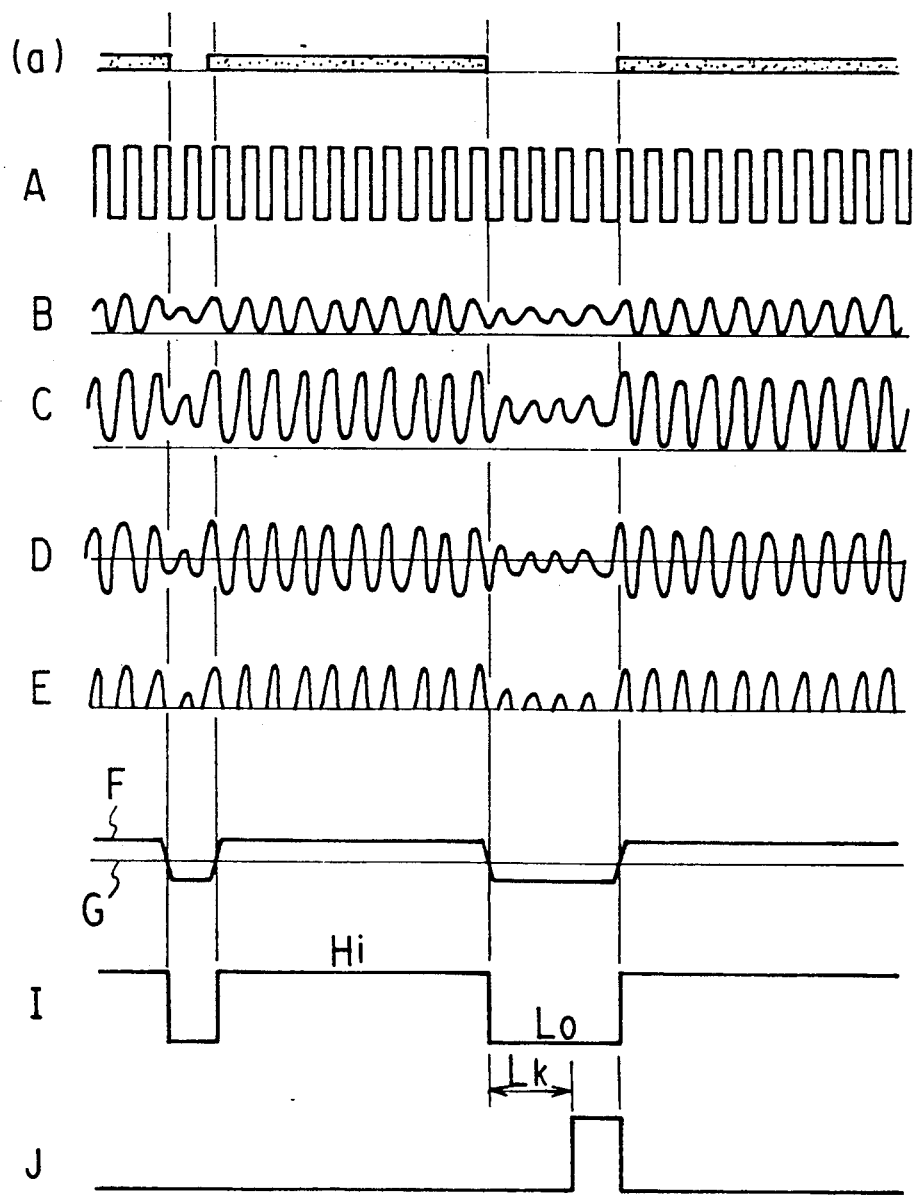
FIG. 12 indicates the output wave forms in continuous gluing from the respective circuits in FIGS. 7 and 10.

In FIG. 12 the output wave forms are given for the respective circuits in FIGS. 7 and 10, in the case of continuous gluing on the gluing object 35 moving at a constant velocity. The electrode unit 39 of horizontal type as shown in FIG. 9 is employed and the electrode 41 receives the high-frequency wave transmitted from the glue 36 applied on the gluing object 35. In FIG. 12 the row (a) indicates the state of the glue 36 on the gluing object 35 and the rows A~J show the wave forms corresponding to the state.

The continuous gluing is set on the gluing controller 34 and the decision-condition setting circuit 57 is assigned to deliver an abnormal signal at the interrupt of gluing longer than $L_k$ in width or interval. This abnormal signal is released with the signal of successful gluing. The explanation of the wave forms A~J is almost same as for FIG. 11.

Figure 13:
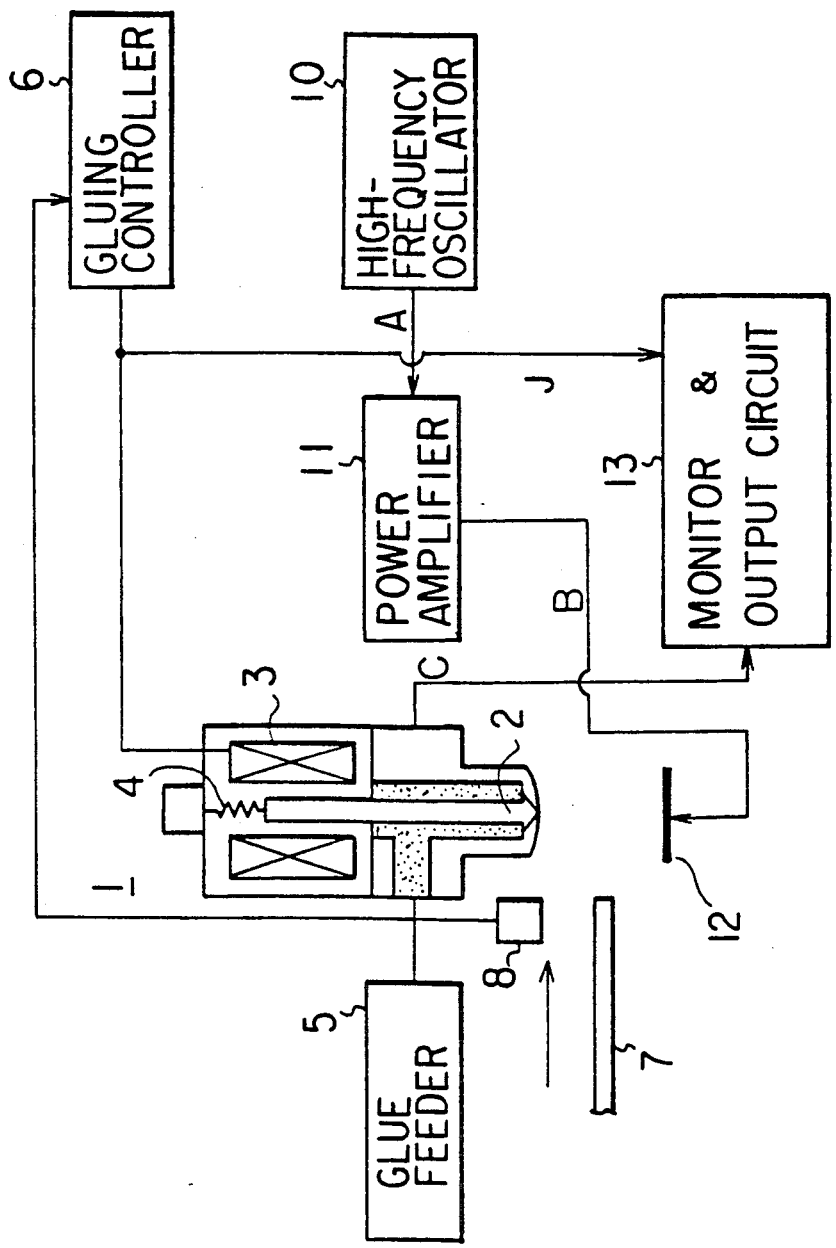
FIG. 13 is a block diagram of another embodiment of the gluing monitor in accordance with the present invention.

FIG. 13 is exemplary of alternate embodiments of the invention which transmit a high-frequency wave from the electrode 12 to the metallic nozzle 1, while in the embodiments described hereinabove a high-frequency wave is transmitted from the metallic nozzle, and received by the electrode. The elements shown in FIG. 13 are identical to those of FIG. 1.

Although obvious changes may be made in the specific embodiments of the invention described herein, such modifications are within the spirit and scope of the invention claimed, indicating that all matter contained herein is intended as illustrative and not as limiting in the scope.

What is claimed is:

1. A gluing monitor comprising:
   (a) a glue applicator nozzle for dispensing glue, wherein said glue is electrically conductive;
   (b) an electrode placed facing said applicator nozzle with a gluing object between said electrode and said nozzle;
   (c) a high-frequency-wave transmitter unit connected to said applicator nozzle;
   (d) a high-frequency-wave receiver unit connected to the electrode; and
   (e) a gluing monitor unit connected to said receiver unit to detect a desired application of glue on said gluing object by comparison of an output signal from said high-frequency-wave receiver unit with a reference value.

2. A gluing monitor according to claim 1, wherein said gluing object is moving in a direction and the center of said electrode is shifted by a specified distance from the center of said applicator nozzle in the direction that said gluing object is moving.

3. A gluing monitor according to claim 1, wherein said electrode is shaped as a ring.

4. A gluing monitor comprising:
   (a) a glue applicator nozzle for dispensing glue, wherein said glue is electrically conductive;
   (b) an electrode placed on a side of said applicator nozzle, facing the glue being discharged out of said applicator nozzle;
   (c) a high-frequency-wave transmitter unit connected to said applicator nozzle;
   (d) a high-frequency-wave receiver unit connected to the electrode; and
   (e) a gluing monitor unit connected to said receiver unit to detect a desired application of glue on a gluing object by comparison of an output from said high-frequency-wave receiver unit with a reference value.

5. A gluing monitor comprising:
   (a) a glue applicator nozzle for dispensing glue, wherein said glue is electrically conductive;
   (b) an electrode placed on a side of said applicator nozzle above a gluing object, facing the glue applied on said gluing object;
   (c) a high-frequency-wave transmitter unit connected to said applicator nozzle;
   (d) a high-frequency-wave receiver unit connected to the electrode; and
   (e) a gluing monitor unit connected to said receiver unit to detect a desired application of glue on said gluing object by comparison of an output from said high-frequency-wave receiver unit with a reference value.

6. A gluing monitor comprising:
   (a) a glue applicator nozzle for dispensing glue, wherein said glue is electrically conductive;
   (b) an electrode placed facing said applicator nozzle with a gluing object between said electrode and said nozzle;
   (c) a high-frequency-wave transmitter unit connected to said electrode;
   (d) a high-frequency-wave receiver unit connected to the nozzle; and
   (e) a gluing monitor unit connected to said receiver unit to detect a desired application of glue on said gluing object by comparison of an output signal from said high-frequency-wave receiver unit with a reference value.

7. A gluing monitor according to claim 6, wherein said gluing object is moving in a direction and the center of said electrode is shifted by a specified distance from the center of said applicator nozzle in the direction that said gluing object is moving.

8. A gluing monitor according to claim 6, wherein said electrode is shaped as a ring.

9. A gluing monitor comprising:
   (a) a glue applicator nozzle for dispensing glue, wherein said glue is electrically conductive;
   (b) an electrode placed on a side of said applicator nozzle facing the glue being discharged out of said applicator nozzle;
   (c) a high-frequency-wave transmitter unit connected to said electrode;
   (d) a high-frequency-wave receiver unit connected to the nozzle; and (e) a gluing monitor unit connected to said receiver unit to detect a desired application of glue on a gluing object by comparison of an output from said high-frequency-wave receiver unit with a reference value.

10. A gluing monitor comprising:

(a) a glue applicator nozzle for dispensing glue, wherein said glue is electrically conductive;

(b) an electrode placed on a side of said applicator nozzle above a gluing object, facing the glue applied on said gluing object;
(c) a high-frequency-wave transmitter unit connected to said electrode;
(d) a high-frequency-wave receiver unit connected to the nozzle; and
(e) a gluing monitor unit connected to said receiver unit to detect a desired application of glue on said gluing object by comparison of an output from said high-frequency-wave receiver unit with a reference value.

* * * * *